(12) United States Patent
Nguyen Van et al.

(10) Patent No.: US 9,975,548 B2
(45) Date of Patent: May 22, 2018

(54) VEHICLE DRIVING SITUATION DETERMINATION APPARATUS AND VEHICLE DRIVING SITUATION DETERMINATION METHOD

(71) Applicant: TOYOTA JIDOSHA KABUSHIKI KAISHA, Toyota-shi, Aichi-ken (JP)

(72) Inventors: Quy Hung Nguyen Van, Susono (JP); Hiroshi Kishi, Shizuoka (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 119 days.

(21) Appl. No.: 14/915,672

(22) PCT Filed: Aug. 28, 2014

(86) PCT No.: PCT/IB2014/001879
§ 371 (c)(1),
(2) Date: Mar. 1, 2016

(87) PCT Pub. No.: WO2015/028881
PCT Pub. Date: Mar. 5, 2015

(65) Prior Publication Data
US 2016/0236681 A1 Aug. 18, 2016

(30) Foreign Application Priority Data
Sep. 2, 2013 (JP) .................. 2013-181635

(51) Int. Cl.
*B60W 30/08* (2012.01)
*G08G 1/16* (2006.01)
(Continued)

(52) U.S. Cl.
CPC ............ *B60W 30/08* (2013.01); *B60Q 9/008* (2013.01); *B60W 30/095* (2013.01);
(Continued)

(58) Field of Classification Search
None
See application file for complete search history.

(56) References Cited

U.S. PATENT DOCUMENTS 8,843,272 B2 * 9/2014 Okita ................... B60W 30/20
701/36
2010/0274435 A1 10/2010 Kondoh et al.
(Continued)

FOREIGN PATENT DOCUMENTS

CN 101754887 A 6/2010
JP 2005186674 A * 7/2005
(Continued)

OTHER PUBLICATIONS

Inoue, Machine translation of JP2005186674A, Jul. 2005, espacenet.com.*

(Continued)

*Primary Examiner* — John Olszewski
*Assistant Examiner* — David P. Merlino
(74) *Attorney, Agent, or Firm* — Sughrue Mion, PLLC (57) ABSTRACT

A vehicle driving situation determination apparatus includes an object detector for detecting an object around a vehicle and an electronic control unit (ECU). The ECU calculates an index relating to a traveling state of the vehicle, wherein the index is a value that is obtained by dividing a jerk of the vehicle by a deceleration. The ECU compares the index to past index statistics, in a case where the object is detected by the object detector and then a response operation against the object by a driver of the vehicle is detected. A driving reaction of the driver of the vehicle is based on a result of this comparison and driving support is executed based on the determination.

10 Claims, 9 Drawing Sheets

(51) Int. Cl.
  *B60W 50/14* (2012.01)
  *B60W 30/095* (2012.01)
  *B60Q 9/00* (2006.01)
  *B60W 50/00* (2006.01)

(52) U.S. Cl.
  CPC ............ *B60W 50/14* (2013.01); *G08G 1/166* (2013.01); *B60W 2050/0089* (2013.01); *B60W 2420/52* (2013.01); *B60W 2540/30* (2013.01); *B60W 2550/10* (2013.01)

(56) References Cited

U.S. PATENT DOCUMENTS

2015/0336579 A1* 11/2015 Yoshizawa ............ B60W 30/08
  701/70
2017/0183000 A1* 6/2017 Yamakado .......... B60W 30/045

FOREIGN PATENT DOCUMENTS

| JP | 2006-172012 A | | 6/2006 |
|---|---|---|---|
| JP | 2006232033 A | * | 9/2006 |
| JP | 2006-335277 A | | 12/2006 |

OTHER PUBLICATIONS

Inoue, Machine translation of JP2006232033A, Sep. 2006, espacenet.com.*

* cited by examiner

VEHICLE DRIVING SITUATION DETERMINATION APPARATUS AND VEHICLE DRIVING SITUATION DETERMINATION METHOD

BACKGROUND OF THE INVENTION

1. Field of the Invention

The present invention relates to a vehicle driving situation determination apparatus and a vehicle driving situation determination method.

2. Description of Related Art

Apparatuses that detect the anxiety of drivers driving vehicles are known. For example, an apparatus that estimates whether or not the driver of the vehicle feels anxiety due to a vehicle behavior from initiation of a brake operation to stopping of the vehicle is described in Japanese Patent Application Publication No. 2006-172012 (JP 2006-172012 A).

The apparatus that is described in JP 2006-172012 A is limited to the estimation of the presence or absence of the anxiety of the driver of the vehicle due to the vehicle behavior from the initiation of the brake operation to the stopping of the vehicle, and does not allow for the determination of a situation of the driver during traveling before the stopping of the vehicle. Accordingly, the driving situation of the driver during the traveling before the stopping of the vehicle cannot be determined with the apparatus that is described in JP 2006-172012 A.

SUMMARY OF THE INVENTION

The present invention provides a vehicle driving situation determination apparatus and a vehicle driving situation determination method with which a driving situation of a driver can be determined during traveling before the stopping of a vehicle.

A vehicle driving situation determination apparatus according to a first aspect of the present invention includes object detection means for detecting an object around a subject vehicle; index calculation means for calculating an index relating to a traveling state of the subject vehicle, which is a value that is obtained by dividing a jerk of the subject vehicle by a deceleration, and comparing the index to past index statistics in a case where the object is detected by the object detection means and then a response operation against the detected object by a driver of the traveling subject vehicle is detected; and determination means for determining a driving situation of the driver of the subject vehicle based on a result of the comparison by the index calculation means.

According to the above-described aspect, the index described above is calculated and is compared to the past index statistics and the driving situation of the driver of the subject vehicle can be determined based on the result of the comparison in a case where the object is detected and then the response operation against the detected object by the driver of the traveling subject vehicle is detected. Accordingly, it can be accurately determined whether or not the driving situation of the driver of the subject vehicle, particularly, a situation of the response operation against the detected object by the driver is as previous (usual) based on the index which is based on the response operation against the detected object by the driver during the traveling before the stopping of the vehicle and the result of the comparison by the past index statistics.

In the above-described aspect, the vehicle driving situation determination apparatus may further include notification means for notifying the driving situation to the driver based on a result of the determination by the determination means.

In this case, not only the driving situation of the driver during the traveling before the stopping of the vehicle can be determined but also the driving situation can be notified to the driver. Particularly, in a case where the response operation against the detected object by the driver is not as previous, the notification is possible in an early stage prior to a dangerous situation (the driver startled) and self-help efforts by the driver can be encouraged for danger avoidance.

In the above-described aspect, the object detection means may be capable of detecting a pedestrian and an obstacle (including a moving object on a road) as the object, and the index statistics be a value that is based on at least one of the response operation against the detected object by the driver against the presence of the pedestrian and the response operation against the detected object by the driver against the presence of the obstacle.

In this case, in a case where the pedestrian and the obstacle as the object are detected, the driving situation of the driver during the traveling before the stopping of the vehicle can be determined very accurately by using the index statistics described above, which allows for at least one of the pedestrian and the obstacle.

In the above-described aspect, the index statistics may be also a value that is based on the response operation against the detected object by the driver against a signal system.

In this case, the driving situation of the driver during the traveling before the stopping of the vehicle can be determined very accurately by using the index statistics described above, which allows for the presence of the signal system (included in the object maintained by traffic regulations such as crossing the white line).

In addition, in the vehicle driving situation determination apparatus according to the present invention, the index calculation means may calculate the index by the following formula (1) when the index is τ, a feature quantity relating to the response operation against the detected object by the driver of the traveling subject vehicle is R, and the amount of change of the R is ΔR.

$$\tau = \Delta R/R \qquad (1)$$

In this case, the driving situation of the driver during the traveling before the stopping of the vehicle, particularly, the situation of the response operation against the detected object by the driver can be determined by calculating the index described above, which allows for the jerk and the deceleration, comparing the index to the past index statistics, and determining the driving situation of the driver of the subject vehicle based on the result of the comparison in a case where the object is detected and then the response operation against the detected object by the driver of the traveling subject vehicle is detected.

In addition, in the vehicle driving situation determination apparatus according to the present invention, the object detection means may be capable of detecting the pedestrian and the obstacle as the object, and the index statistics be an average value of a history of the index that is based on at least one of the response operation against the detected object by the driver against the presence of the pedestrian and the response operation against the detected object by the driver against the presence of the obstacle.

In this case, the pedestrian and the obstacle as the object are detected and the driving situation of the driver during the traveling before the stopping of the vehicle, particularly, the situation of the response operation against the detected object by the driver can be determined by using the average value of the history of the indices described above which allow for the presence of at least one of the pedestrian and the obstacle.

A vehicle driving situation determination method according to a second aspect of the present invention includes detecting an object around a subject vehicle with a vehicle driving situation determination apparatus; calculating an index relating to a traveling state of the subject vehicle, which is a value that is obtained by dividing a jerk of the subject vehicle by a deceleration, and comparing the index to past index statistics with the vehicle driving situation determination apparatus in a case where the object is detected and then a response operation against the detected object by a driver of the traveling subject vehicle is detected; and determining a driving situation of the driver of the subject vehicle based on a result of the comparison with the vehicle driving situation determination apparatus.

A vehicle driving situation determination apparatus according to a third aspect of the present invention includes an object detection unit configured to detect an object around a vehicle; and an electronic control unit configured to: (a) calculate an index relating to a traveling state of the subject vehicle, the index is a value that is obtained by dividing a jerk of the subject vehicle by a deceleration, and compare the index to past index statistics, in a case where the object is detected by the object detection unit and then a response operation against the detected object by a driver of the traveling vehicle is detected; and (b) determine a driving situation of the driver of the vehicle based on a result of the comparison.

According to a fourth aspect of the present invention, a vehicle driving situation determination method for a vehicle including an object detecting unit and an electronic control unit, the vehicle driving situation determination method including: detecting an object around the vehicle by the object detecting unit; calculating, by the electronic control unit, an index relating to a traveling state of the vehicle wherein the index is a value that is obtained by dividing a jerk of the vehicle by a deceleration and comparing, by the electronic control unit, the index to past index statistics, in a case where the object is detected and then a response operation against the detected object by a driver of the traveling vehicle is detected; and determining, by the electronic control unit, a driving situation of the driver of the vehicle based on a result of the comparing.

According to the above-described aspect, the index described above is calculated and is compared to the past index statistics and the driving situation of the driver of the subject vehicle can be determined based on the result of the comparison in a case where the object is detected and then the response operation against the detected object by the driver of the traveling subject vehicle is detected. Accordingly, it can be accurately determined whether or not the driving situation of the driver of the subject vehicle, particularly, a situation of the response operation against the detected object by the driver is as previous based on the index which is based on the response operation against the detected object by the driver during the traveling before the stopping of the vehicle and the result of the comparison by the past index statistics.

According to the above-described object, a vehicle driving situation determination apparatus and a vehicle driving situation determination method with which a situation of a driver can be determined during traveling before the stopping of a vehicle can be provided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, preferred embodiments of the present invention will be described in detail with reference to the accompanying drawings. In the following description, the same reference numerals are attached to the same or similar elements to omit redundant description.

Figure 1:
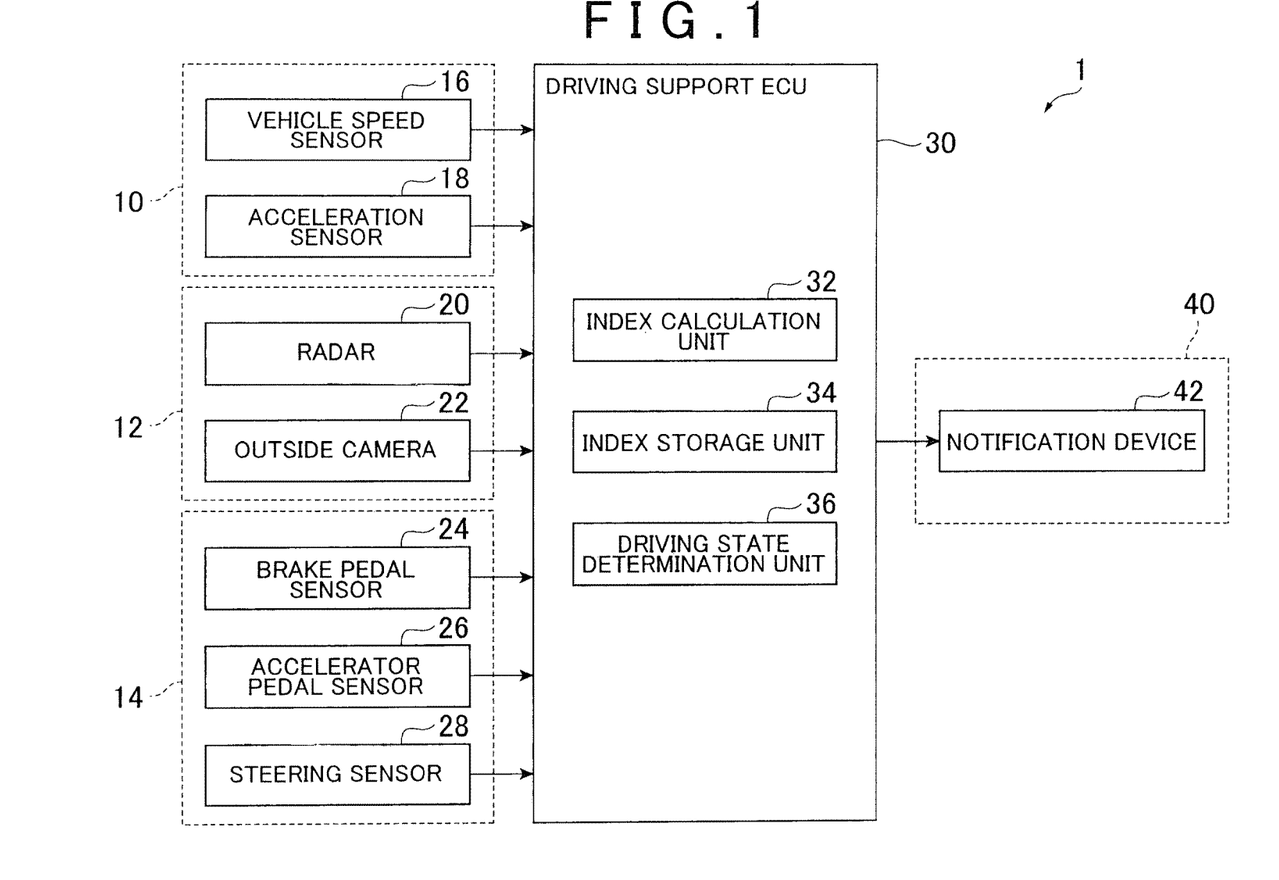
FIG. 1 is a block diagram illustrating a functional configuration of a situation determination apparatus according to an embodiment of the present invention.

FIG. 1 is a block diagram illustrating the functional configuration of a vehicle driving situation determination apparatus (hereinafter, situation determination apparatus) according to an embodiment of the present invention. The situation determination apparatus is an apparatus that is mounted on a subject vehicle, calculates an index $\tau$ (described later) relating to change in the velocity of the subject vehicle between the detection of an object around the subject vehicle and a response operation (for example, an accelerator pedal OFF operation, a brake pedal ON operation, and steering initiation) performed by a driver against the detected object, and compares the index $\tau$ to past index $\tau$ statistics to determine a driving situation of the driver, particularly, the response of the driver against the detected object. As illustrated in FIG. 1, a situation determination apparatus 1 includes a traveling state detection unit 10, an object detection unit 12, a driving operation detection unit 14, a driving support ECU 30, and an output unit 40.

The traveling state detection unit 10 detects information relating to the traveling state of the subject vehicle. In one embodiment, the traveling state detection unit 10 has a vehicle speed sensor 16 and an acceleration sensor 18. The vehicle speed sensor 16 is a sensor that detects the speed of the subject vehicle. The acceleration sensor 18 is a sensor that detects the acceleration (deceleration, and acceleration/deceleration) and jerk of the subject vehicle. The time differentiation of the speed is the acceleration, and the time differentiation of the acceleration is the jerk. In a case where the acceleration during deceleration is −a (a is a positive number), the deceleration is a. The acceleration sensor 18 may be a sensor that is capable of detecting the jerk by calculating the jerk from the acceleration (deceleration) of the subject vehicle or may be a sensor that is capable of directly detecting the jerk of the subject vehicle. The traveling state detection unit 10 outputs subject vehicle travel information that is detected by using various types of sensors, including the speed and the acceleration, to the driving support ECU 30.

The object detection unit 12 detects objects around the subject vehicle. Herein, the objects refer to moving objects that are present around the subject vehicle and can become obstacles, such as other vehicles and pedestrians. In one embodiment, the object detection unit 12 has radar 20 and an outside camera 22. The radar 20 is a measuring instrument that measures the distance from the object. The radar 20, for example, transmits electromagnetic waves while scanning the electromagnetic waves in a horizontal plane, and receives the reflected waves that are reflected by the object and return to. The radar 20 obtains information, such as the presence or absence of the object, the orientation of the object viewed from the vehicle, the distance from the vehicle to the object, and the relative speed of the object with respect to the vehicle, from frequency change in the received signal. The outside camera 22 is, for example, is a multi-camera that images the front-back direction and the right-left direction of the subject vehicle with a predetermined frequency to obtain information such as the presence or absence of the object, the orientation of the object viewed from the vehicle, the relative distance from the vehicle to the object, and the relative speed of the object with respect to the vehicle. The object detection unit 12 outputs the object information that is detected by using various types of sensors, including the orientation of the object, and the relative speed and the relative distance between the subject vehicle and another vehicle, to the driving support ECU 30. The object detection unit 12 functions as the object detection means or the object detection unit described in the claims.

The driving operation detection unit 14 detects a driving operation by the driver. In one embodiment, the driving operation detection unit 14 has a brake pedal sensor 24, an accelerator pedal sensor 26, and a steering sensor 28. The brake pedal sensor 24 is a sensor that detects a timing when a brake pedal is stepped on and the amount of stepping on the brake pedal. The accelerator pedal sensor 26 is a sensor that detects a timing when an accelerator pedal is stepped on and the amount of stepping on the accelerator pedal. The steering sensor 28 is a sensor that detects a steering initiation timing and the steering amount of the steering. The driving operation detection unit 14 outputs driving operation information, which includes the details of the driving operation by the driver of the subject vehicle, to the driving support ECU 30.

The driving support ECU 30 is a computer that has a central processing unit (CPU), a read only memory (ROM), a random access memory (RAM), and the like, and is a device that determines whether or not to execute driving support control on the subject vehicle. The driving support ECU 30 has an index calculation unit 32, an index storage unit 34, and a driving state determination unit 36.

The index calculation unit 32 obtains the index $\tau$ based on the subject vehicle travel information that is output from the traveling state detection unit 10 and the object information that is output from the object detection unit 12. The index $\tau$ is an index relating to the traveling state of the subject vehicle, and is the greatest value or the maximum value among values that are obtained at each unit time $\Delta t$ by dividing the jerk of the subject vehicle at the point of time (time differentiation value of the deceleration) by the deceleration at the point of time (time differentiation value of the speed). In a case where the object around the subject vehicle is detected and then the response operation (behavior for collision avoidance) against the detected object by the driver of the traveling subject vehicle is detected, the index calculation unit 32 calculates the index $\tau$ relating to the traveling state of the subject vehicle until the detection of the cancellation of the response operation or the detection of the operation opposite to the response operation. Examples of the response operation include the accelerator pedal OFF operation (stepping off), the brake pedal ON operation (stepping on), and the steering initiation. Examples of the cancellation of the response operation or the operation opposite to the response operation including an accelerator pedal ON operation (stepping on), a brake pedal OFF operation (stepping off), and steering back. The index calculation unit 32 functions as the index calculation means described in the claims.

Examples of the response operation against the detected object by the driver include the stepping on the brake pedal, the stepping off the accelerator pedal, and the steering for avoiding a collision with the object (detected object). In a case where the response operation by the driver is, for example, the stepping on the brake pedal, the cancellation of the response operation or the operation opposite to the response operation is, for example, the stepping off the brake pedal. In a case where the response operation by the driver is, for example, the stepping off the accelerator pedal, the cancellation of the response operation or the operation opposite to the response operation is, for example, the stepping on the accelerator pedal. In addition, in a case where the response operation by the driver is, for example, is right steering for avoiding the collision with the object, the cancellation of the response operation or the operation opposite to the response operation is, for example, left steering. In a case where the response operation by the driver is, for example, is left steering for avoiding the collision with the object, the cancellation of the response operation or the operation opposite to the response operation is, for example, right steering. The index $\tau$ described above is the greatest value or the maximum value among the values that are obtained at each unit time by dividing the jerk of the subject vehicle at the point of time (time differentiation value of the deceleration) by the deceleration at the point of time (time differentiation value of the speed). The index calculation unit 32 compares the calculated index $\tau$ to the past index $\tau$ statistics stored in the index storage unit 34. The past index $\tau$ statistics is a value within a predetermined range (described later) including, for example, the average value of all past indices $\tau$. The index calculation unit 32 may compare the calculated index $\tau$ to the past index $\tau$ statistics of each type of detection target stored in the index storage unit 34. Examples of the types of the detection targets include a pedestrian, an obstacle, and a signal.

Figure 2:
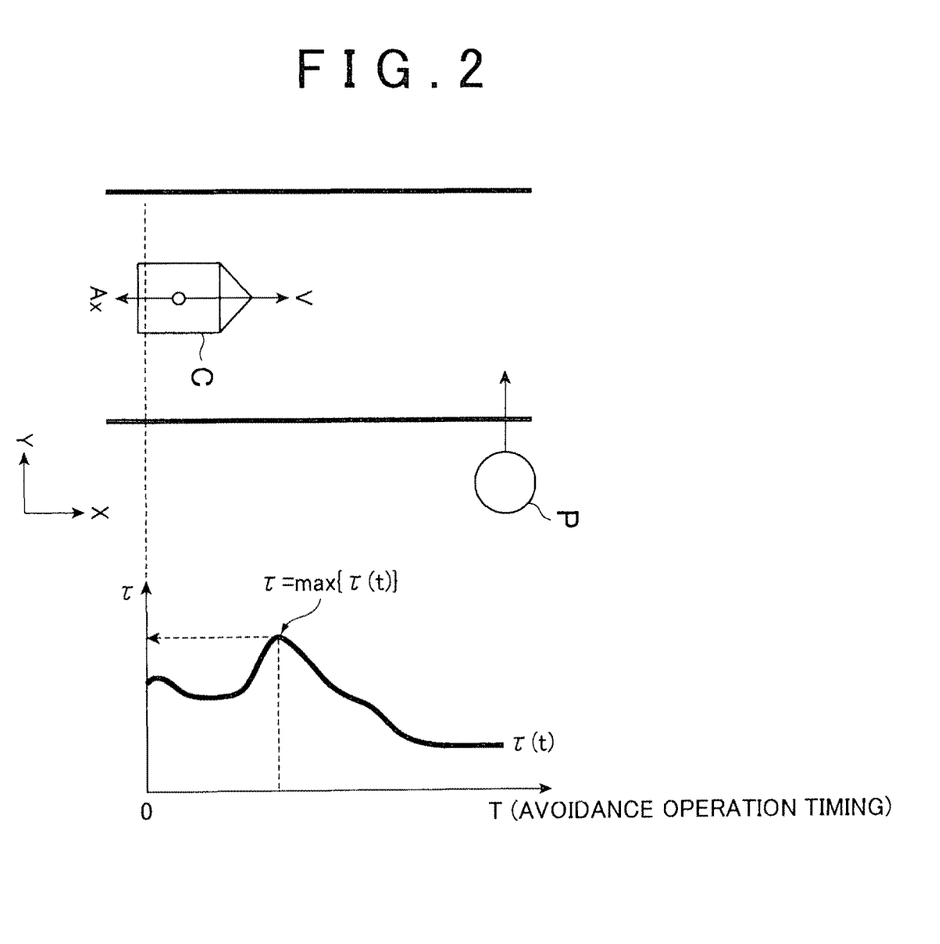
FIG. 2 is an explanatory diagram showing a method for obtaining an index $\tau$ that is performed by the situation determination apparatus in FIG. 1.

The method for obtaining the index $\tau$ will be described in further detail with reference to FIG. 2. For convenience of description, the direction of travel of the subject vehicle in FIG. 2 is referred to as an X-axis direction, and the width direction component of the subject vehicle orthogonal to the X-axis direction is referred to as a Y-axis direction. FIG. 2 illustrates a situation in which the subject vehicle C travels in the X-axis direction on a road at a speed V and a pedestrian P moves in the Y-axis direction (direction toward the subject vehicle C) off the road. Hereinafter, the acceleration of the subject vehicle C in the −X direction (that is, the deceleration) at time t is referred to as A(t) (m/s$^2$) and the jerk at the time t is referred to as J(t) (m/s$^3$). In one embodiment, the index calculation unit 32 calculates the index τ by the following formula (1). In other words, the index τ is the greatest value or the maximum value among the values that are obtained at each unit time Δt by dividing the jerk of the subject vehicle at the point of time (time differentiation value of the deceleration) by the deceleration at the point of time (time differentiation value of the speed).

$$\tau = \max\{\tau(t)\} = \max\{J(t)/A(t)\} \tag{1}$$

The index τ can be generalized as illustrated in the following formula (2). Herein, R is a feature quantity relating to the behavior of the traveling subject vehicle such as the deceleration, and ΔR is the amount of change of R.

$$\tau = \Delta R/R \tag{2}$$

In a case where the driver avoids the collision with the object through a braking operation, R and ΔR can be illustrated as in the following formula (3) as a first example of R and ΔR. Herein, Ax is the deceleration of the subject vehicle in the direction of travel x at the point of time, and α is a design parameter (weighting coefficient). In addition, V is the speed of the subject vehicle at the point of time, and J is the jerk of the subject vehicle at the point of time.

$$R = Ax + \alpha V, \ \Delta R = dR/dt = J + \alpha Ax \tag{3}$$

In a case where the driver avoids the collision with the object through a steering operation, R and ΔR can be illustrated as in the following formula (4) as a second example of R and ΔR. Herein, β is a design parameter (weighting coefficient).

$$R = \text{(rotational acceleration)} + \beta \times \text{(rotational angular velocity)}, \ \Delta R = \text{(differentiation of rotational acceleration)} + \beta \times \text{(rotational acceleration)} \tag{4}$$

In a case where the driver avoids the collision with the object through simultaneous braking and steering operations, R and ΔR can be illustrated as in the following formula (5) as a third example of R and ΔR. Herein, τs is an index that is obtained based on the above formula (4), τb is an index that is obtained based on the above formula (3), and K is a design parameter (weighting coefficient).

$$\tau = \tau s + K \times \tau b \tag{5}$$

The index storage unit 34 is means for storing the past index τ statistics, which is calculated by the index calculation unit 32, on a database. The situation determination apparatus 1 can be set to be in an initial learning mode where the additional storage and update of the index τ and the τmax value are performed. In a case where the situation determination apparatus 1 is set in this manner, the index storage unit 34 stores the past index τ statistics, which is calculated by the index calculation unit 32, on the database. The past index τ statistics is a value within a predetermined range illustrating a range with a relatively high possibility of the index τ being usually obtained, which is represented by using the average value and the standard deviation of the past indices τ. In one embodiment, the past index τ statistics stored by the index storage unit 34 is a value within a predetermined range that is equal to or greater than the τmin (described later) and is equal to or less than the τmax including the average value of the history of the index τ based on at least one of the response operation by the driver against the presence of the pedestrian and the response operation by the driver against the presence of the obstacle. In addition, in one embodiment, the past index τ statistics stored by the index storage unit 34 is a value within a predetermined range that is equal to or greater than the τmin (described later) and is equal to or less than the τmax including the average value of the history of the index τ based on the response operation by the driver against a signal system (and signal display details). The index storage unit 34 functions as the index calculation means described in the claims.

The driving state determination unit 36 is means for determining whether or not to conduct control of notification to the driver based on the result of the comparison by the index calculation unit 32. In a case where the calculated index τ is included in the past index τ statistics, the driving state determination unit 36 determines that a "usual" (as always) driving reaction (particularly, the response operation against the detected object) is performed and determines not to conduct the notification control. In a case where the calculated index τ is not included in the past index τ statistics, the driving state determination unit 36 determines that an "unusual" driving reaction is performed and determines to conduct the notification control (described later). When the driving state determination unit 36 determines to conduct the notification control, the driving state determination unit 36 outputs a control signal that allows the notification control to be conducted to the output unit 40. The driving state determination unit 36 functions as the determination means described in the claims.

Examples of the conducting of the notification control include the notification of the driving situation to the driver and calling for the attention of the driver by performing alarm display with a display as a human machine interface (HMI), a speaker, a light-emitting device, and a device applying vibration to the accelerator pedal.

Herein, the method for determining whether or not the calculated index τ is included in the past index τ statistics will be described in detail. The driving state determination unit 36 determines whether or not the index τ that is calculated by the index calculation unit 32 satisfies the condition of the following formula (6). k1 and k2 in the following formula (6) are design parameters (weighting coefficients) of at least one, and the σ is the standard deviation of all of the past indices τ. In a case where the index τ that is calculated by the index calculation unit 32 is determined to satisfy the condition of the following formula (6) (that is, the τ is equal to or greater than the τmin and is equal to or less than the τmax), the driving state determination unit 36 determines that the usual driving reaction is performed. In a case where the index τ that is calculated by the index calculation unit 32 is determined not to satisfy the condition of the following formula (6), for example, in a case where the index τ is determined to satisfy the condition of the following formula (7), the driving state determination unit 36 determines that the unusual driving reaction is performed.

$$\text{(Past average value of the } \tau) - k2 \times \sigma \leq \tau \leq \text{(Past average value of the } \tau) + k1 \times \sigma \tag{6}$$

$$\tau > \text{(Past average value of the } \tau) + k1 \times \sigma \tag{7}$$

Figure 3:
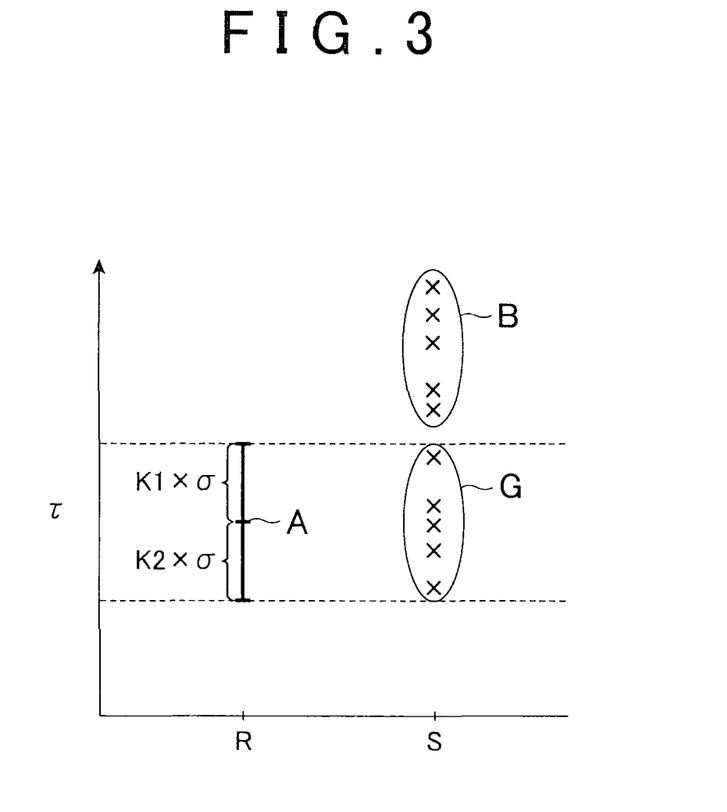
FIG. 3 is an explanatory diagram showing a method for determining whether or not the index $\tau$ is included in past index $\tau$ statistics that is performed by the situation determination apparatus in FIG. 1.

The method for determining whether or not the calculated index τ is included in the past index τ statistics will be described in further detail with reference to FIG. 3. The vertical axis represents the size of the index τ, the column R on the horizontal axis represents the past index τ statistics, and the column S represents the index τ that is calculated by the index calculation unit 32. The past index τ statistics is a value ranging from a value that is lower than the average value A of the past τ by k2×σ and a value that is higher than the average value A of the past τ by k1×σ. In a case where the index τ that is calculated by the index calculation unit 32 is included in the past index τ statistics (represented as the Group G), the driving state determination unit 36 determines that the usual driving reaction is performed. In a case where the index τ that is calculated by the index calculation unit 32 is not included in the past index τ statistics (represented as the Group B), the driving state determination unit 36 determines that the unusual driving reaction is performed.

Referring back to FIG. 1, the output unit 40 is a device that executes the notification control which corresponds to the output from the driving support ECU 30. In one embodiment, the output unit 40 has a notification device 42. The notification device 42, examples of which include a display as a human machine interface (HMI), a speaker, a light-emitting device, and a device applying vibration to the accelerator pedal, is a device that outputs alarm display based on the control signal which is output from the driving support ECU 30 and notifies the driving situation to the driver. The notification device 42 functions as the notification means described in the claims.

Figure 4:
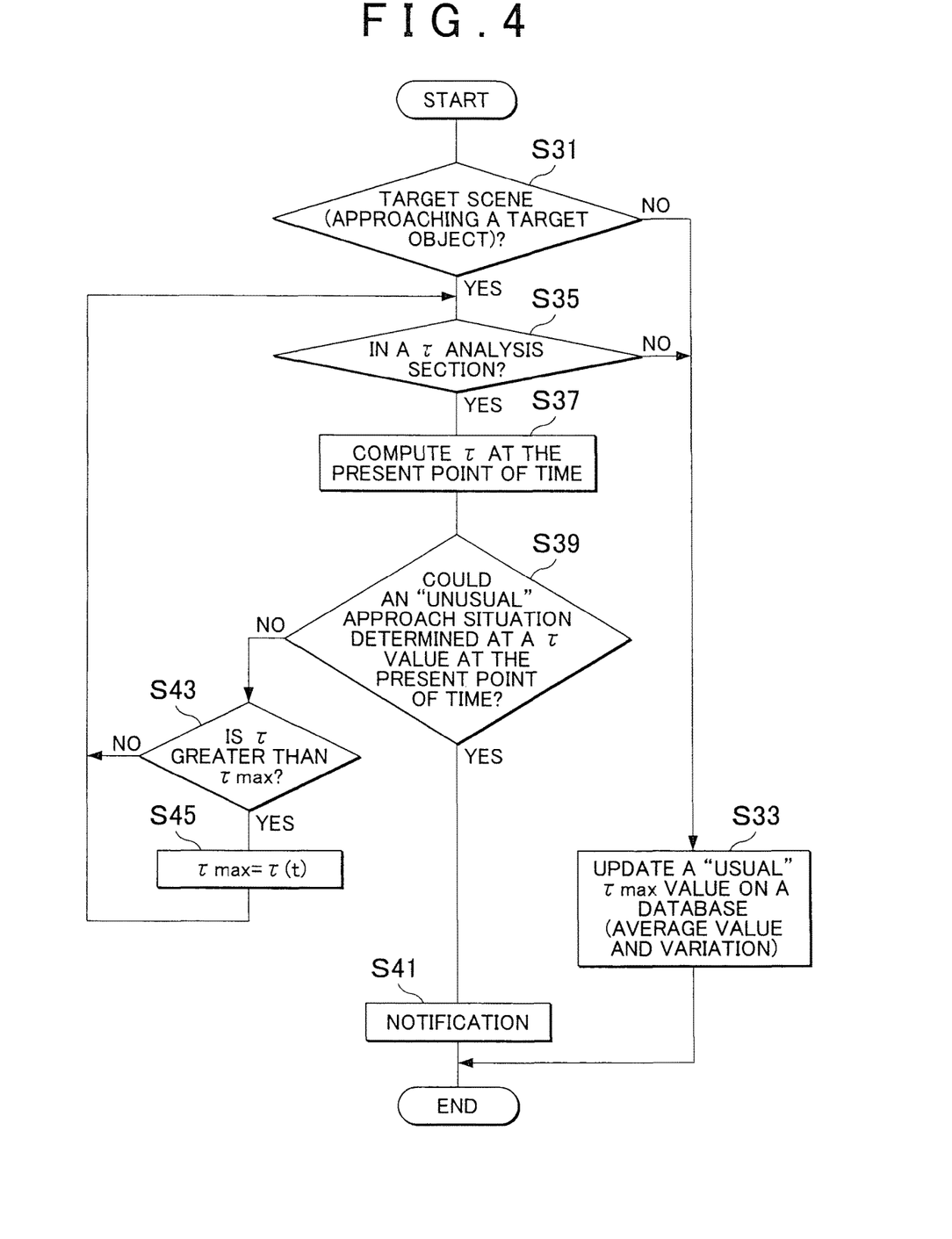
FIG. 4 is a flow diagram illustrating an operation that is performed by the situation determination apparatus in FIG. 1.

Next, the operation of the situation determination apparatus 1 according to one embodiment and the vehicle driving situation determination method according to one embodiment will be described with reference to FIG. 4. FIG. 4 is a flow diagram illustrating the operation of the situation determination apparatus 1 according to one embodiment. Herein, the situation determination apparatus 1 obtains statistics by accumulating the past indices τ that are calculated in advance by the index calculation unit 32, and stores the past indices τ and the statistics on the storage unit (RAM) or the like in the driving support ECU 30. Each of the processes illustrated in FIG. 4 is initiated when, for example, the presence of the target object as the object around the subject vehicle is detected by the situation determination apparatus 1 and is repeatedly executed at predetermined intervals.

Firstly, the driving support ECU 30 of the situation determination apparatus 1 obtains the subject vehicle travel information, the object information, and the driving operation information as travel data as illustrated in FIG. 4 from the traveling state detection unit 10, the object detection unit 12, and the driving operation detection unit 14 (object detection step), and determines whether or not the subject vehicle is in a target scene at the present point of time (Step S31). The target scene is a situation in which the object around the subject vehicle is detected. In a case where the subject vehicle is determined not to be in the target scene at the present point of time, the driving support ECU 30 stores the τmax value (temporarily stored on a memory (described later)), which is the highest value among the indices τ determined to be "usual" by the driving state determination unit 36 until the present point of time, on the database in the index storage unit 34 (Step S33). As the τmax value that is the highest value among the indices τ which are determined to be "usual" is stored on the database in this manner, the average value A and the variation σ are also updated based on the stored τmax value. Then, a series of the processing is completed.

In a case where the subject vehicle is determined to be in the target scene at the present point of time, it is determined whether or not the subject vehicle is in a τ analysis section at the present point of time (Step S35). The τ analysis section is a period from the detection of the response operation (for example, an accelerator OFF operation, a brake ON operation, and steering initiation) to the detection of the cancellation of the response operation or the detection of the operation opposite to the response operation (for example, an accelerator ON operation, a brake OFF operation, and steering initiation) in the case of the detection of the response operation (for example, an accelerator OFF operation, a brake ON operation, and steering initiation) against the detected object by the driver of the traveling subject vehicle. In a case where the subject vehicle is determined not to be in the τ analysis section at the present point of time, the process moves to Step S33 described above. In other words, the driving support ECU 30 stores the τmax value on the database in the index storage unit 34. When the max value is stored on the database, the average value A and the variation σ are also updated. Then, a series of the processing is completed. In a case where the subject vehicle is determined to be in the τ analysis section at the present point of time, the index calculation unit 32 calculates the index τ by computing based on the subject vehicle travel information that is output from the traveling state detection unit 10 and the object information that is output from the object detection unit 12, and compares the index τ to the past index τ statistics stored in the index storage unit 34 (Step S37, index calculation step).

Then, the driving state determination unit 36 determines whether or not to conduct the notification control based on the result of the comparison by the index calculation unit 32 (Step S39, determination step). In a case where the calculated index τ at the present point of time is included in the past index τ statistics, the driving state determination unit 36 determines that the "usual" (as always) driving reaction is performed, determines not to conduct the notification control, and moves to Step S43 (described later). In a case where the calculated index τ at the present point of time is not included in the past index τ statistics, the driving state determination unit 36 determines that the "unusual" driving reaction is performed, and determines to conduct the notification control. When the driving state determination unit 36 determines to conduct the notification control, the driving state determination unit 36 outputs the control signal that allows the notification control to be conducted the output unit 40. Then, the output unit 40 executes the notification described above in response to the output from the driving support ECU 30 (Step S41). Then, a series of the processing is completed.

In Step S43, the driving state determination unit 36 determines whether or not the index τ that is calculated in Step S37 is greater than the τmax value that is the highest value among the indices τ which are determined to be "usual" by the driving state determination unit 36. In a case where the calculated index τ is determined to be greater than the τmax value, the index τ can be substituted with the τmax value which is the highest value so that the τmax value is temporarily updated and stored on the memory (Step S45). Then, the process moves to Step S35 described above after the lapse of the unit time of t (Δt). In a case where the index τ is determined to be equal to or less than, the τmax value, the process moves to Step S35 described above.

Figure 5:
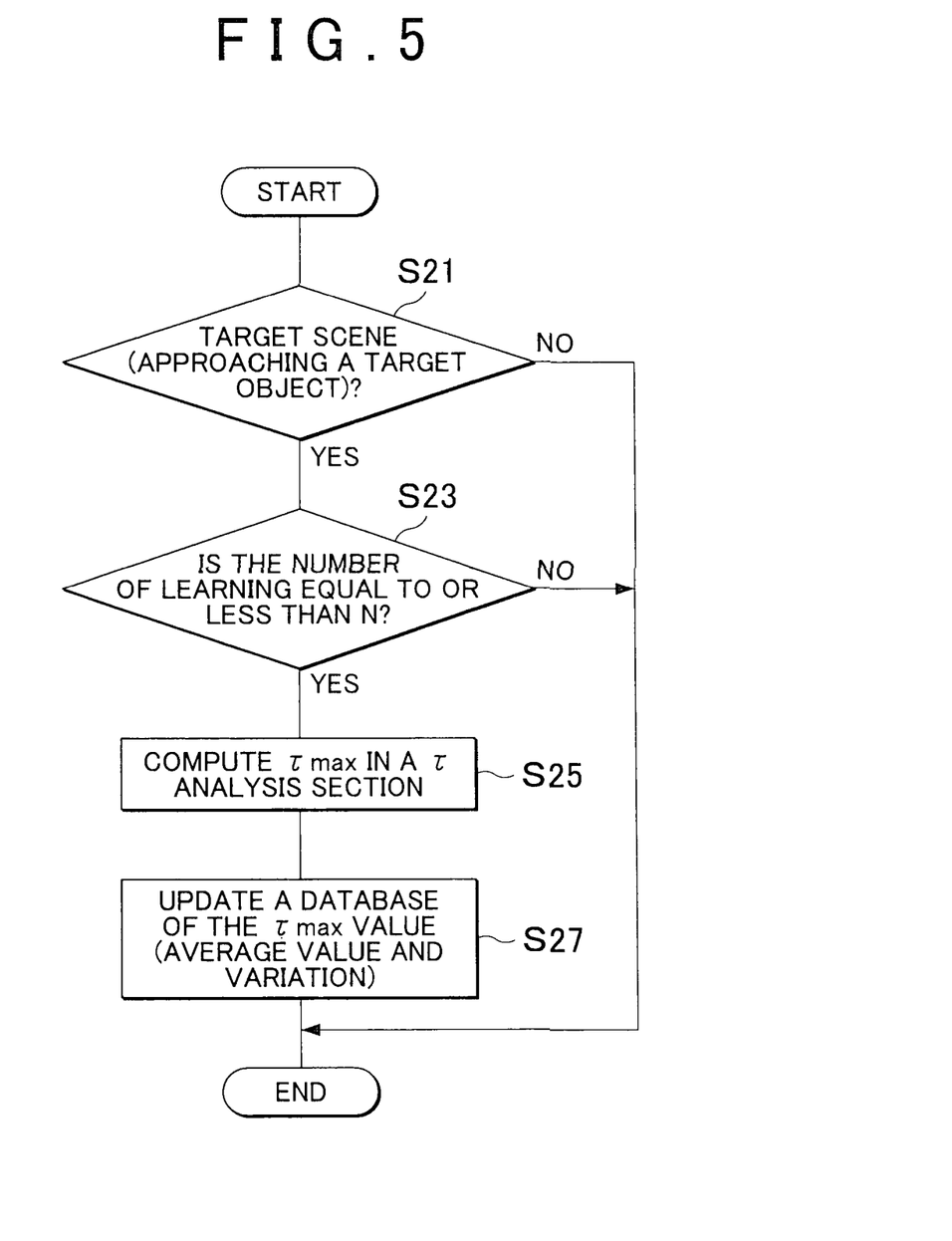
FIG. 5 is a flow diagram illustrating an operation that is performed by the situation determination apparatus in FIG. 1.

Next, the operation in a case where the situation determination apparatus 1 according to one embodiment is set to be in the initial learning mode where the additional storage and update of the τmax value are performed will be described with reference to FIG. 5. FIG. 5 is a flow diagram illustrating this operation. Each of the processes illustrated in FIG. 5 is initiated when, for example, the presence of the object around the subject vehicle is detected by the situation determination apparatus 1 and is repeatedly executed at predetermined intervals.

Firstly, the driving support ECU 30 of the situation determination apparatus 1 obtains the subject vehicle travel information, the object information, and the driving operation information as the travel data as illustrated in FIG. 5 from the traveling state detection unit 10, the object detection unit 12, and the driving operation detection unit 14 (object detection step), and determines whether or not the subject vehicle is in a target scene at the present point of time (Step S21). The target scene is a situation in which the object around the subject vehicle is detected. In a case where the subject vehicle is determined not to be in the target scene at the present point of time, a series of the processing is completed.

In a case where the subject vehicle is determined to be in the target scene at the present point of time, the index storage unit 34 determines whether or not the number of storage (number of learning) of the τ value on the index storage unit 34 is equal to or less than N. N is a number pre-defined when the τ value is stored in the initial learning mode, and is a design parameter. In a case where the additional storage processing is performed on the max value unlimitedly, the number of storage N of the τ value may be set to infinity. Herein, in a case where the number of storage of the τ value is determined to be greater than N, a series of the processing is completed. In a case where the number of storage of the τ value is determined to be equal to or less than N, the process moves to Step S25 (described later).

In Step S25, the driving support ECU 30 calculates the τmax value, which is the highest value among the indices τ in the τ analysis section, by computing. Then, the driving support ECU 30 stores the calculated τmax value on the database in the index storage unit 34 (Step S27). When the max value that is the highest value among the indices τ is stored on the database in this manner, the average value A and the variation σ are also updated. Then, a series of the processing is completed. The driving support ECU 30 may be processed so that the τmax value in a case where it is determined that the "unusual" driving reaction is performed is not stored on the database.

Figure 6:
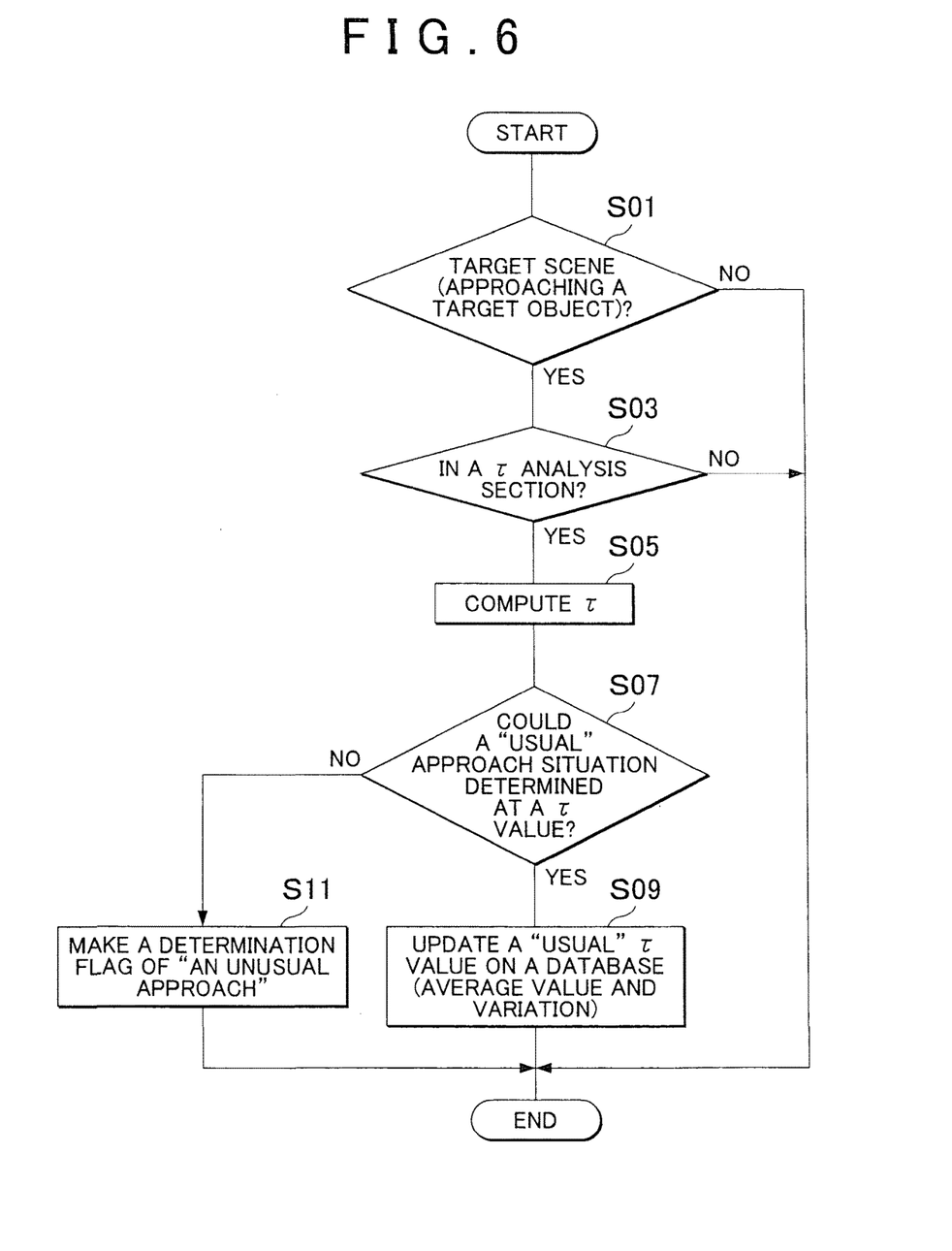
FIG. 6 is a flow diagram illustrating an operation that is performed by the situation determination apparatus in FIG. 1.

Next, the operation of a situation determination apparatus 1 and a vehicle driving situation determination method according to another embodiment that is different from the one embodiment described above will be described with reference to FIG. 6. The configuration of the situation determination apparatus 1 is similar to that of the one embodiment described above, but the operation of the situation determination apparatus 1 is different from that of the one embodiment described above. FIG. 6 is a flow diagram illustrating the operation of the situation determination apparatus 1 according to the other embodiment that is different from the one embodiment described above. Herein, the situation determination apparatus 1 obtains statistics by accumulating the past indices τ that are calculated in advance by the index calculation unit 32, and stores the past indices τ and the statistics on the storage unit (RAM) or the like in the driving support ECU 30. Each of the processes illustrated in FIG. 6 is initiated when, for example, the presence of the object around the subject vehicle is detected by the situation determination apparatus 1 and is repeatedly executed at predetermined intervals.

Firstly, the driving support ECU 30 of the situation determination apparatus 1 obtains the subject vehicle travel information, the object information, and the driving operation information as the travel data as illustrated in FIG. 6 from the traveling state detection unit 10, the object detection unit 12, and the driving operation detection unit 14 (object detection step), and determines whether or not the subject vehicle is in a target scene at the present point of time (Step S01). The target scene is a situation in which the object around the subject vehicle is detected. In a case where the subject vehicle is determined not to be in the target scene at the present point of time, a series of the processing is completed.

In a case where the subject vehicle is determined to be in the target scene at the present point of time, it is determined whether or not the subject vehicle is in the τ analysis section described above at the present point of time (Step S03). In a case where the subject vehicle is determined not to be in the τ analysis section at the present point of time, a series of the processing is completed. In a case where the subject vehicle is determined to be in the τ analysis section at the present point of time, the index calculation unit 32 calculates the index τ by computing based on the subject vehicle travel information that is output from the traveling state detection unit 10 and the object information that is output from, the object detection unit 12, and compares the index τ to the past index τ statistics stored in the index storage unit 34 (Step S05, index calculation step).

Then, the driving state determination unit 36 determines whether or not to conduct the control of the notification to the driver based on the result of the comparison by the index calculation unit 32 (Step S07, determination step). In a case where the calculated index τ at the present point of time is included in the past index τ statistics, the driving state determination unit 36 determines that the "usual" (as always) driving reaction is performed, determines not to conduct the notification control, and moves to Step S09 (described later). In a case where the calculated index T at the present point of time is not included in the past index τ statistics, the driving state determination unit 36 determines that the "unusual" driving reaction is performed, and the process moves to Step S11 (described later).

In Step S09, the driving support ECU 30 stores the index τ, which is determined to be "usual" by the driving state determination unit 36 until the present point of time, on the database in the index storage unit 34 (Step S33). As the index τ that is determined to be "usual" is stored on the database in this manner, the average value A and the variation σ are also updated. Then, a series of the processing is completed.

In Step S11, the driving support ECU 30 makes a determination Flag of "unusual approach." The determination Flag of "unusual approach" can be used in, for example, determining whether or not to conduct the notification control. Then, a series of the processing is completed.

Figure 7:
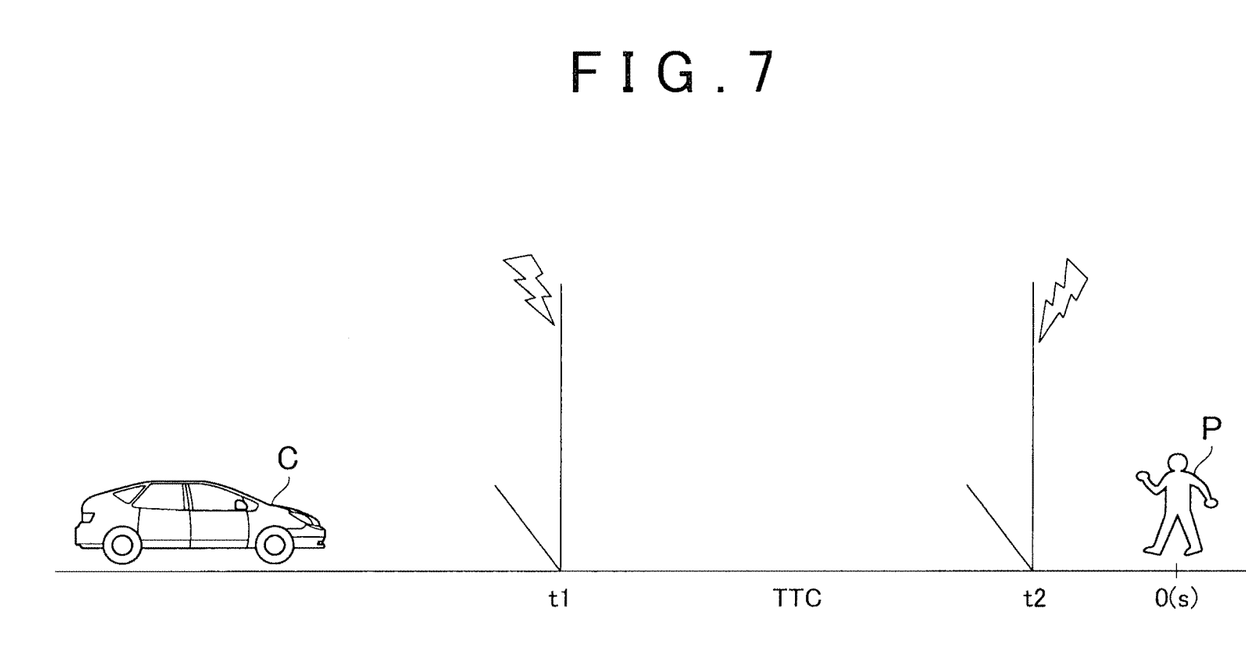
FIG. 7 is an explanatory diagram showing an effect of the situation determination apparatus in FIG. 1.

Next, the effect of the situation determination apparatus 1 according to one embodiment will be described with reference to FIG. 7. FIG. 7 is a diagram showing a case where the time to collision (TTC), which is the length of time until a collision between the subject vehicle C and the object P, is the horizontal axis in a situation in which the driver of the subject vehicle C allows the subject vehicle C to travel unaware of the presence of the object P. In a case where a collision avoidance response operation by the driver of the traveling subject vehicle C is detected after the detection of the object P, the index τ described above is calculated and is compared to the past index statistics, and it can be determined more accurately whether or not the driving situation of the driver, of the subject vehicle C is "usual" (as always) based on the result of the comparison according to the situation determination apparatus 1. In this manner, the driving situation of the driver (particularly, the degree of approach and danger of the object P can be recognized and responded to the same degree as usual) during the traveling before the stopping of the vehicle can be determined accurately and objectively within a short period of time (within approximately one second).

When the driving situation of the driver is "usual" and the collision avoidance response operation (for example, stepping on the brake pedal) by the driver detected with the TTC being the relatively early timing of t1 leads to the performing of the driving support described above (for example, notification of being not "usual" to the driver) at this timing, the driver may feel this driving support troublesome since the driving situation is "usual."

However, in a case where the index τ described above is calculated and is compared to the past index statistics and the calculated index τ at the present point of time is included in the past index τ statistics, the "usual" (as always) driving reaction is determined to be performed and the driving support control is not conducted according to the situation determination apparatus 1. Accordingly, it is possible to prevent the driver from feeling the trouble.

When the driving situation of the driver is not "usual" and the collision avoidance response operation (for example, stepping on the brake pedal) by the driver detected with the TTC being the relatively late timing of t2 leads to the performing of the driving support described above (for example, notification of the performing of the response operation which is not "usual" to the driver) at this timing, the driver may be startled by the relatively late driving support and the driver may feel the driving support insufficient.

However, according to the situation determination apparatus 1, the index τ described above is calculated and is compared to the past index statistics, and the "unusual" driving reaction is determined to be performed and the driving support control (for example, notification to the driver and control of the subject vehicle) is conducted at a point of time when the calculated index τ at the present point of time is determined not to be included in the past index τ statistics (that is, at a point of time before the TTC is t2). Accordingly, it is possible to prevent the driver from being startled by the relatively late driving support and the driver from feeling the driving support insufficient.

In addition, according to the situation determination apparatus 1, not only the driving situation of the driver during the traveling before the stopping of the vehicle can be determined but also the driving situation can be notified to the driver within a short period of time (for example, within approximately one second). As a result, it is possible to encourage the driver to make self-help efforts (for example, stepping on the brake pedal) for collision avoidance in a stage prior to the actuation of automatic braking and the like. Particularly, in a case where the response operation against the detected object by the driver is not as previous, the notification is possible in an early stage prior to a dangerous situation (the driver startled) and the self-help efforts by the driver can be encouraged for danger avoidance.

In addition, in a case where the pedestrian and the obstacle (including a moving object on the road) as the object are detected, the situation relating to the driving sense of the driver during the traveling before the stopping of the vehicle can be determined very accurately by using the index statistics described above, which allows for the characteristics of the driver capable of recognizing the presence of at least one of the pedestrian and the obstacle, according to the situation determination apparatus 1.

In addition, the situation relating to the response operation against the signal system (and signal display details) by the driver during the traveling before the stopping of the vehicle can be determined very accurately by using the index statistics described above, which allows for the presence of the signal system (included in the object maintained by traffic regulations such as crossing the white line), according to the situation determination apparatus 1.

In addition, in a case where the response operation against the detected object by the driver of the traveling subject vehicle is detected after the detection of the object, the index τ described above, which allows for the jerk and the deceleration, is calculated and is compared to the past index statistics, and the driving situation of the driver of the subject vehicle can be determined based on the result of the comparison according to the situation determination apparatus 1. In this manner, the driving situation of the driver during the traveling before the stopping of the vehicle, particularly the situation of the response operation relating to the speed control timing of the driver against the detected object, can be determined very accurately.

In addition, according to the situation determination apparatus 1, the greatest value or the maximum value of the index τ during the relatively short period of time from the detection of the response operation described above to the detection of the cancellation of the response operation or the detection of the operation opposite to the response operation is stored and accumulated by employing the statistics so that the driving situation of the driver, particularly the situation of the response operation against the detected object by the driver can be determined with a relatively short period of time (within approximately one second) by using the statistics which allows for the response operation against the detected object by the driver of the traveling subject vehicle during the relatively short period of time after the detection of the object.

In addition, according to the situation determination apparatus 1, the pedestrian and the obstacle as the object are detected and the driving situation of the driver during the traveling before the stopping of the vehicle, particularly, the situation of the response operation against the detected object by the driver can be determined by using the average value of the history of the index described above which allow for the presence of at least one of the pedestrian and the obstacle. In this manner, the reference for the determination that the "usual" (as always) driving reaction is performed can be what has a width around the average value of the history of the index.

One embodiment of the present invention has been described above. However, the present invention is not limited to the above embodiment, and various modified aspects may constitute the present invention. For example, the situation determination apparatus 1 may be configured so that the oldest τmax value is removed from the database at every point of time when the additional storage of the τmax value is performed in one trip (that is, a period from the turning ON of the engine to the turning OFF of the engine) in an operation in a case where the situation determination apparatus 1 is set to be in the initial learning mode where the additional storage and update of the τmax value are performed so as to respond to a case where the subject vehicle not familiar with driving becomes familiar with driving through a long period of driving by the driver.

In this manner, the old τmax value at a time of not being familiar with driving is removed, and thus a change in the τmax value due to the familiarization with driving by the driver can be responded to. Accordingly, even in a case where the driver changes driven vehicles, the τmax value can be changed to respond to the driver not familiar with the driving of the changed vehicle if the situation determination apparatus is mounted on the changed vehicle. Moreover, the present invention may be configured so that the driver is distinguished by using an identification ID or the like that is assigned to the driver of the vehicle and the τmax value is changed to respond to each distinguished driver whenever the driver rides in the vehicle.

Figure 8:
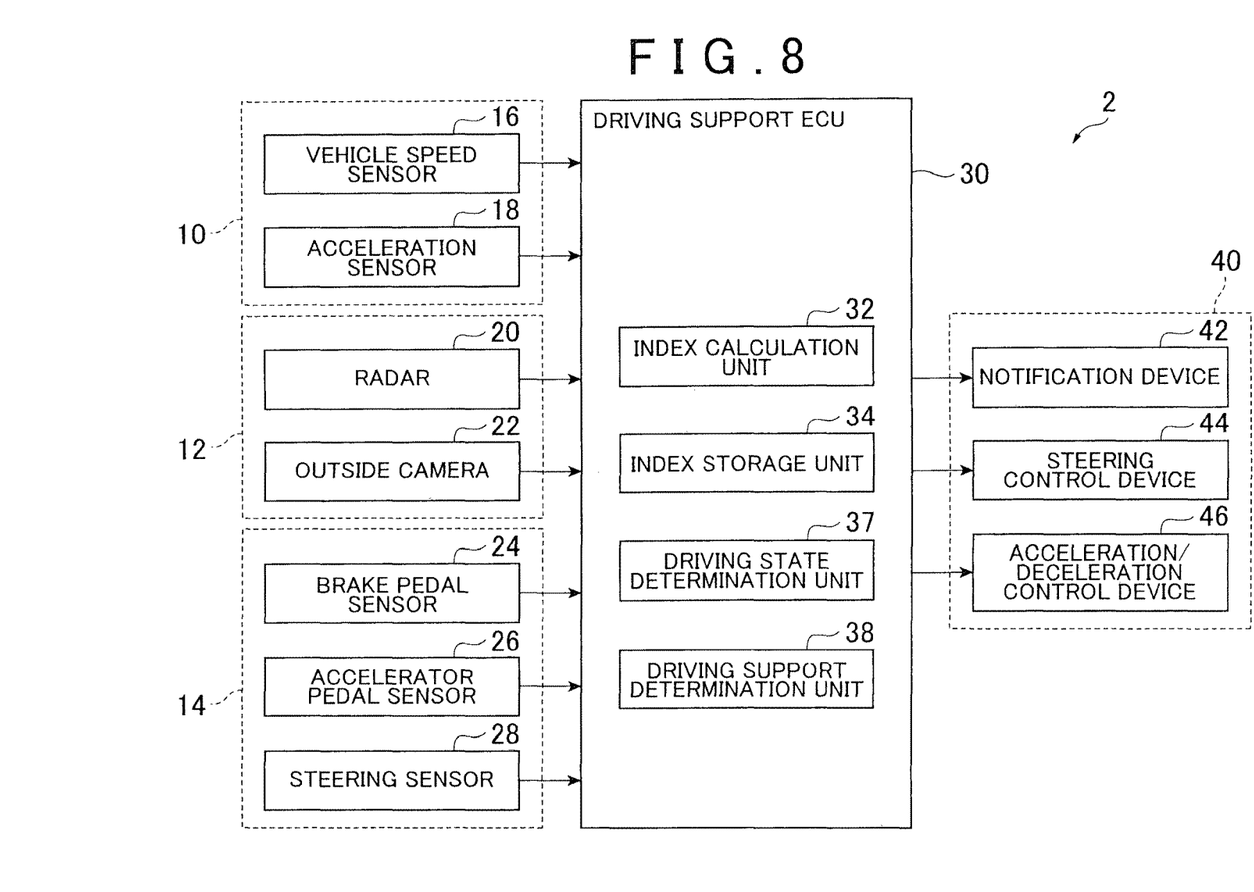
FIG. 8 is a block diagram illustrating the functional configuration of a situation determination apparatus according to a modification example of the present invention.

In addition, a situation determination apparatus 2, in which the driving support ECU 30 in FIG. 1 has the index calculation unit 32, the index storage unit 34, a driving state determination unit 37, and a driving support determination unit 38 and the output unit 40 has the notification device 42, a steering control device 44, and an acceleration/deceleration control device 46, may be configured as the situation determination apparatus according to another embodiment as illustrated in FIG. 8.

The driving state determination unit 37 is means for determining whether or not the "usual" (as always) driving reaction (particularly, the response operation against the detected object) is performed based on the result of the comparison by the index calculation unit 32. In a case where the calculated index τ is included in the past index τ statistics, the driving state determination unit 37 determines that the "usual" (as always) driving reaction (particularly, the response operation against the detected object) is performed. In a case where the calculated index τ is not included in the past index τ statistics, the driving state determination unit 37 determines that the "unusual" driving reaction is performed. The driving state determination unit 37 outputs a signal, which shows whether or not the "usual" (as always) driving reaction is performed to the driving support determination unit 38. The driving state determination unit 37 functions as the determination means described in the claims.

The driving support determination unit 38 is means for determining whether or not to conduct vehicle driving support control based on the result of the determination by the driving state determination unit 37. In a case where the result of the determination by the driving state determination unit 37 is the performing of the "usual" (as always) driving reaction (particularly, the response operation against the detected object), the driving support determination unit 38 determines not to conduct the driving support control. In a case where the result of the determination by the driving state determination unit 37 is the performing of the "unusual" driving reaction, the driving support determination unit 38 determines to conduct the driving support control (described later). When the driving support determination unit 38 determines to conduct the driving support control, the driving support determination unit 38 outputs a control signal that allows the driving support control to be conducted to the output unit 40. The driving support determination unit 38 functions as the determination means described in the claims.

Herein, the conducting of the driving support control includes driving support for avoiding a collision with the object and driving support for stabilizing the behavior of the vehicle. The driving support for avoiding the collision includes collision avoidance by braking intervention, collision avoidance by steering intervention, and calling for the attention of the driver. In addition, the collision avoidance by the braking intervention or the steering intervention includes intervention by automatic braking or automatic steering, assistance for a braking force or a steering force, and the encouragement of operation by the driver using a physical stimulus (for example, display, sound, and vibration). In addition, the conducting of the driving support control includes not only the exercise of the driving support itself but also the improvement in the range of the detection and the accuracy of the detection of the object, the lowering of the condition of the driving support exercise, the shortening of the driving support exercise timing, and the raising of the level of the driving support (for example, change from a warming to the braking intervention). In addition, the exercise of the driving support includes not only a transition from a state where the driving support is not performed to a state where the driving support is performed but also switching from a state where the driving support is conducted to another driving support and further conducting another driving support from a state where the driving support is conducted.

Herein, the method for determining whether or not the calculated index τ is included in the past index τ statistics is similar to the method for determining by the driving state determination unit 36, and thus description will not be repeated.

Referring back to FIG. 1, the output unit 40 is a device that executes the driving support which corresponds to the output from the driving support ECU 30. In one embodiment, the output unit 40 has the notification device 42, the steering control device 44, and the acceleration/deceleration control device 46. The notification device 42, examples of which include a display as a human machine interface (HMI), a speaker, a light-emitting device, and a device applying vibration to the accelerator pedal, is a device that outputs alarm display based on the control signal which is output from the driving support ECU 30 and notifies the driving situation to the driver. The notification device 42 functions as the notification means described in the claims. The steering control device 44 is a device that controls the steering angle of the subject vehicle by the control amount which corresponds to the control signal output from the driving support ECU 30. The acceleration/deceleration control device 46 is a device that controls a throttle actuator, a brake actuator, and the like by the control amount which corresponds to the control signal output from the driving support ECU 30 and controls the acceleration/deceleration of the subject vehicle.

Figure 9:
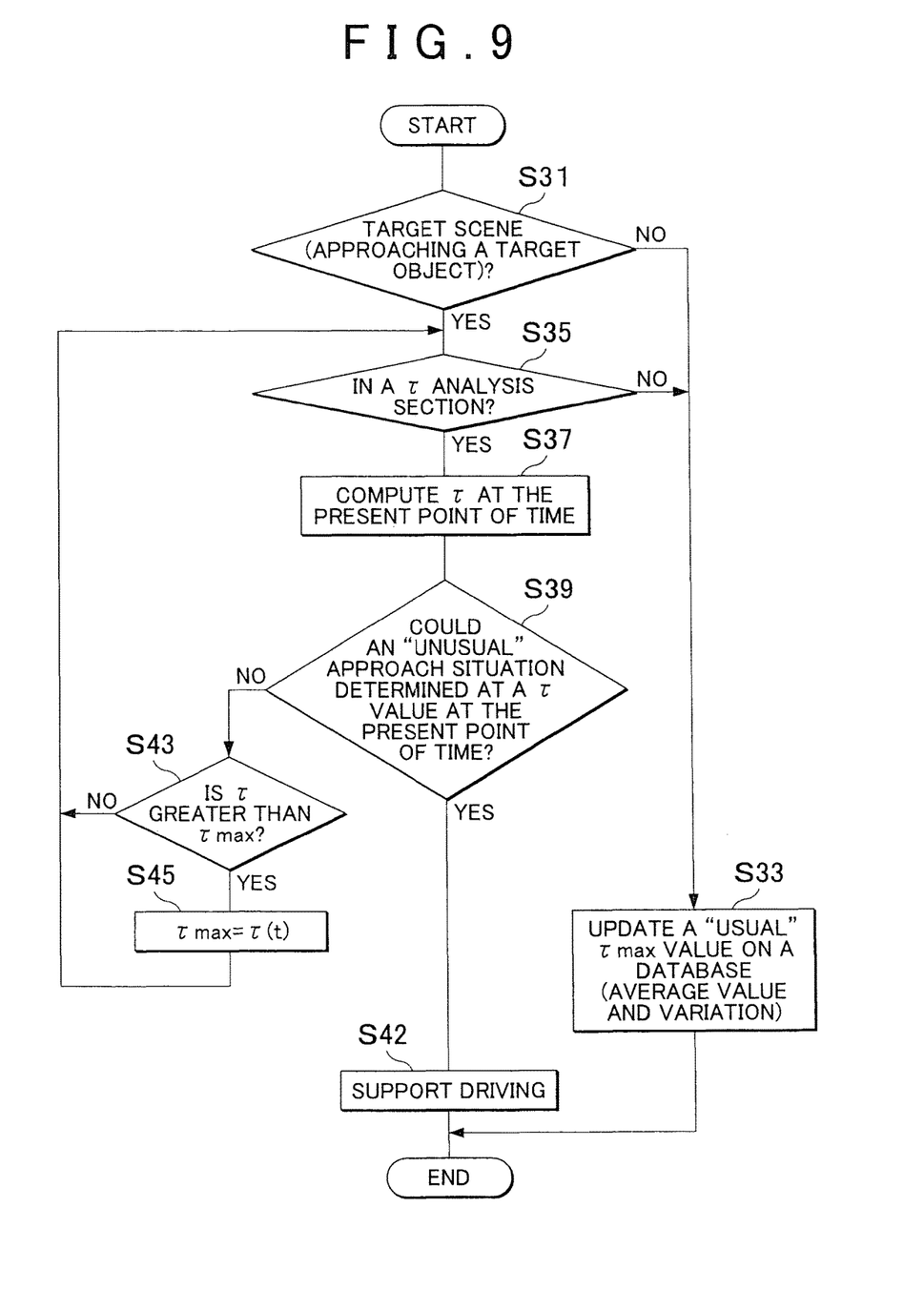
FIG. 9 is a flow diagram illustrating an operation that is performed by the situation determination apparatus in FIG. 8.

Next, The operation of the situation determination apparatus 2 and the vehicle driving situation determination method according to one embodiment will be described with reference to FIG. 9. In FIG. 9, Step S41 in FIG. 4 is substituted with Step S42, and redundant description will not be repeated.

In Step S39, the driving support determination unit 38 determines whether or not to conduct the vehicle driving support control based on the result of the comparison by the index calculation unit 32 (determination step). In a case where the calculated index τ at the present point of time is included in the past index τ statistics, the driving support determination unit 38 determines that the "usual" (as always) driving reaction is performed, determines not to conduct the driving support control, and the process moves to Step S43 described above. In a case where the calculated index τ at the present point of time is not included in the past index τ statistics, the driving support determination unit 38 determines that the "unusual" driving reaction is performed, and determines to conduct the driving support control. When the driving support determination unit 38 determines to conduct the driving support control, the driving support determination unit 38 outputs the control signal that allows the driving support control to be conducted to the output unit 40. Then, the output unit 40 executes the driving support described above (for example, notification to the driver and automatic control of the subject vehicle) in response to the output from the driving support ECU 30 (Step S42). Then, a series of the processing is completed.

According to the present invention, the driving situation of the driver during the traveling before the stopping of the vehicle can be determined.

The invention claimed is:

1. A vehicle driving reaction determination apparatus comprising:
   a radar or a camera configured to detect an object around a vehicle; and
   an electronic control unit programmed to:
   (a) calculate an index relating to a traveling state of the vehicle, the index is a value that is obtained by dividing a jerk of the vehicle by a deceleration, and compare the index to past index statistics, in a case where the object is detected by the radar or the camera, and then a response operation against the object by a driver of the vehicle is detected, wherein the past index statistics are based on an accumulated value of previously calculated indexes;
   (b) determine a driving reaction of the driver of the vehicle based on a result of the comparison; and
   (c) execute driving support of the vehicle based upon a result of the determination of the driving reaction of the driver of the vehicle.

2. The vehicle driving reaction determination apparatus according to claim 1, further comprising:
   at least one of a human machine interface (HMI), speaker, light-emitting device or device applying vibration to an accelerator pedal, to notify the driving support to the driver based on a result of the determination by the electronic control unit.

3. The vehicle driving reaction determination apparatus according to claim 1,
   wherein the radar or the camera is capable of detecting a pedestrian and an obstacle as the object, and
   wherein each of the previously calculated indexes is a value that is based on at least one of the response operation against the object by the driver against the presence of the pedestrian and the response operation against the object by the driver against the presence of the obstacle.

4. The vehicle driving reaction determination apparatus according to claim 3,
   wherein, in a case where the response operation against the object by the driver of the vehicle is detected after the detection of the object by the radar or the camera, the electronic control unit is further programmed to employ a greatest value or a maximum value of the index from the detection of the response operation to a detection of a cancellation of the response operation or a detection of an operation opposite to the response operation.

5. The vehicle driving reaction determination apparatus according to claim 1,
   wherein each of the previously calculated indexes is a value that is based on the response operation against the object by the driver against a signal system.

6. The vehicle driving reaction determination apparatus according to claim 1,
   wherein, in a case where the response operation against the object by the driver of the vehicle is detected after the detection of the object by the radar or the detector, the electronic control unit is further programmed to employ a greatest value or a maximum value of the index from the detection of the response operation to a detection of a cancellation of the response operation or a detection of an operation opposite to the response operation.

7. The vehicle driving reaction determination apparatus according to claim 6,
   wherein the radar or the camera is capable of detecting a pedestrian and an obstacle as the object, and
   wherein the past index statistics comprise an average value of the previously calculated indexes that that are based on at least one of the response operation against the object by the driver against the presence of the pedestrian and the response operation against the object by the driver against the presence of the obstacle.

8. The vehicle driving reaction determination apparatus according to claim 1, wherein the electronic control unit compares the index to the past index statistics where a similar object was detected by the radar or the camera with a corresponding response operation by the driver of the vehicle.

9. The vehicle driving reaction determination apparatus according to claim 1, wherein the radar or the camera is capable of detecting a pedestrian and an obstacle as the object, and
   wherein the past index statistics comprise a value that is based on the response operation corresponding to a similar object being at least one of the pedestrian and the obstacle.

10. A vehicle driving reaction determination method for a vehicle including a radar or a camera, and an electronic control unit, the vehicle driving reaction determination method comprising:
    detecting an object around the vehicle by the radar or the camera;
    calculating, by the electronic control unit, an index relating to a traveling state of the vehicle wherein the index is a value that is obtained by dividing a jerk of the vehicle by a deceleration and comparing, by the electronic control unit, the index to past index statistics, in a case where the object is detected and then a response operation against the object by a driver of the vehicle is detected, wherein the past index statistics are based on an accumulated value of previously calculated indexes;
    determining, by the electronic control unit, a driving reaction of the driver of the vehicle based on a result of the comparing; and
    executing driving support of the vehicle based upon a result of the determination of the driving reaction of the driver of the vehicle.

* * * * *